United States Patent [19]

Lucas, Jr.

[11] 3,924,095
[45] Dec. 2, 1975

[54] NARROW-GROOVE WELDING
[75] Inventor: Matthew J. Lucas, Jr., Fairfield, Ohio
[73] Assignee: The Babcock & Wilcox Company, New York, N.Y.
[22] Filed: May 29, 1974
[21] Appl. No.: 474,478

[52] U.S. Cl. ........ 219/125 R; 219/125 PL; 219/130
[51] Int. Cl.² ........................................... B23K 9/12
[58] Field of Search ........... 219/61, 125 R, 125 PL, 219/130

[56] References Cited
UNITED STATES PATENTS

| | | | |
|---|---|---|---|
| 2,944,141 | 7/1960 | Lovrenich | 219/125 PL X |
| 3,123,702 | 3/1964 | Keidel et al. | 219/130 X |
| 3,328,556 | 6/1967 | Nelson et al. | 219/125 R X |
| 3,590,212 | 6/1971 | Corrigall et al. | 219/130 |
| 3,826,888 | 7/1974 | Garfield et al. | 219/130 X |

Primary Examiner—J. V. Truhe
Assistant Examiner—N. D. Herkamp
Attorney, Agent, or Firm—J. Maguire; R. J. Edwards; E. A. Mosley

[57] ABSTRACT

Narrow groove welding wherein a consumable electrode is passed through a heat and electrically insulated welding head inserted in the narrow groove. Movement of the welding head in the narrow groove is controlled to coordinate vertical, longitudinal and lateral movement of the head relative to the welding position, and protective gas is used closely adacent the arc to form a high quality weld bead in the narrow gap.

9 Claims, 6 Drawing Figures

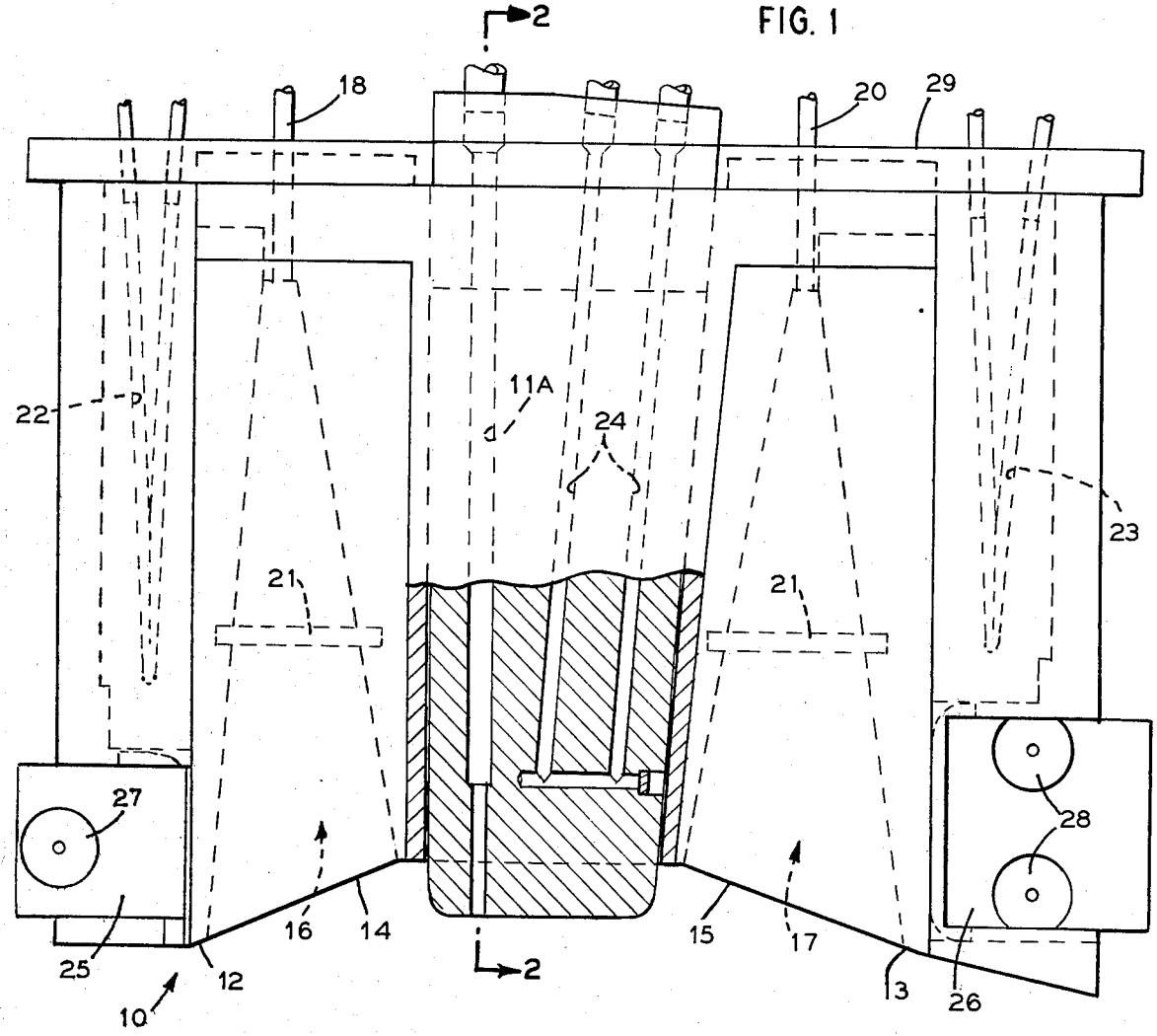
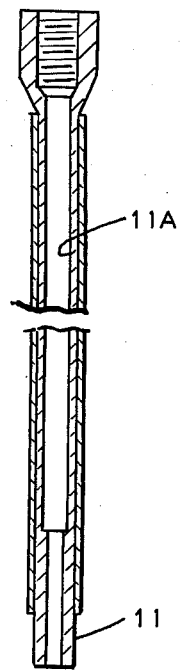

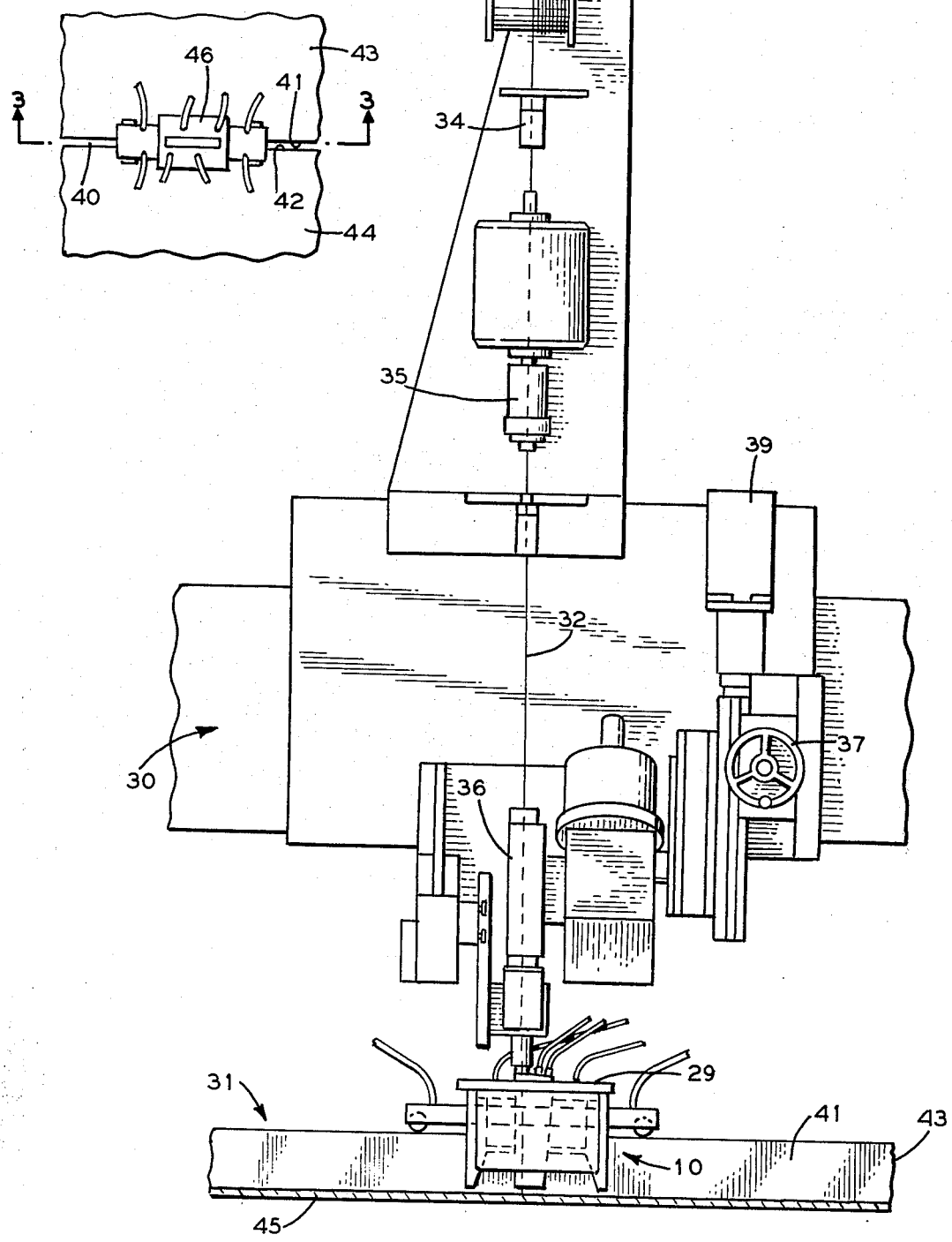

AUTOMATIC TORCH CENTERING BY USE OF
EDDY CURRENT SENSORS

NARROW-GROOVE WELDING

The present invention relates to the weld joining of thick plates, more particularly, to narrow groove welding of thick plates by gas shielded consumable electrodes.

Heretofore thick plates have been joined by various systems such as, for example, by the submerged arc procedure and the like, but the adjacent surfaces to be joined by welding have been machined or otherwise prepared in advance to provide a "V" notch having a large volume which must be filled with metal to form the joint. Such welds have proven to be of high quality but require a great deal of time and large volumes of weld metal to fill the gap and to thereby join the adjacent edges of the plates.

In recent years a concept of narrow-gap or narrow groove welding has been the subject of experimental work and patents have issued both here and abroad on various methods of operation and combinations of apparatus intended to accomplish such welding. For example, U.S. Pat. No. 3,325,626 and British Patent No. 1,205,208 have issued showing the general concept of narrow gap welding. Up to the present time none of the proposed arrangements of narrow gap welding have proven to be commercially successful. The reasons for lack of success have been manifold, but usually relate to the difficulty of obtaining a high quality weld at an economical rate.

In the present invention, apparatus and methods of operation have been developed which largely overcome the difficulties in providing commercial units for welding plates having a thickness in excess of 2 inches. In general, according to the invention, the plates to be welded are spaced from ¼ to ½ of an inch apart and have generally straight side walls. The side walls of the grooves are not necessarily machined to high tolerance values, but will be substantially smooth with protuberances thereon not over a few thousandths of an inch in deviation from the surface of the plane of the groove side walls.

To obtain a satisfactory welded joint, it has been found that the consumable weld wire should be centered in the groove and the arcing current from the tip of the electrode should be sufficient to bridge the side walls of the joint. The selection of the proper voltage and amperage, and speed of welding must be closely correlated to obtain a sound joint. Moreover, it has been found that an inert gas shield must be provided closely adjacent the weld arc to protect the weld during formation and to provide sufficient penetration of the weld and adequate wetting of the walls of the plates to form a satisfactory welded joint.

OF THE DRAWINGS

FIG. 1 is an elevation, partly in section, of a welding head and shield for use in accordance with the present invention.

FIG. 2 is a section taken on line 2—2 of FIG. 1;

FIG. 3 is a schematic front view of the welding head mounting assembly for the production of a narrow groove weld.

FIG. 4 is a partial plan view of a welding head positioned in a narrow groove;

Figure 5:
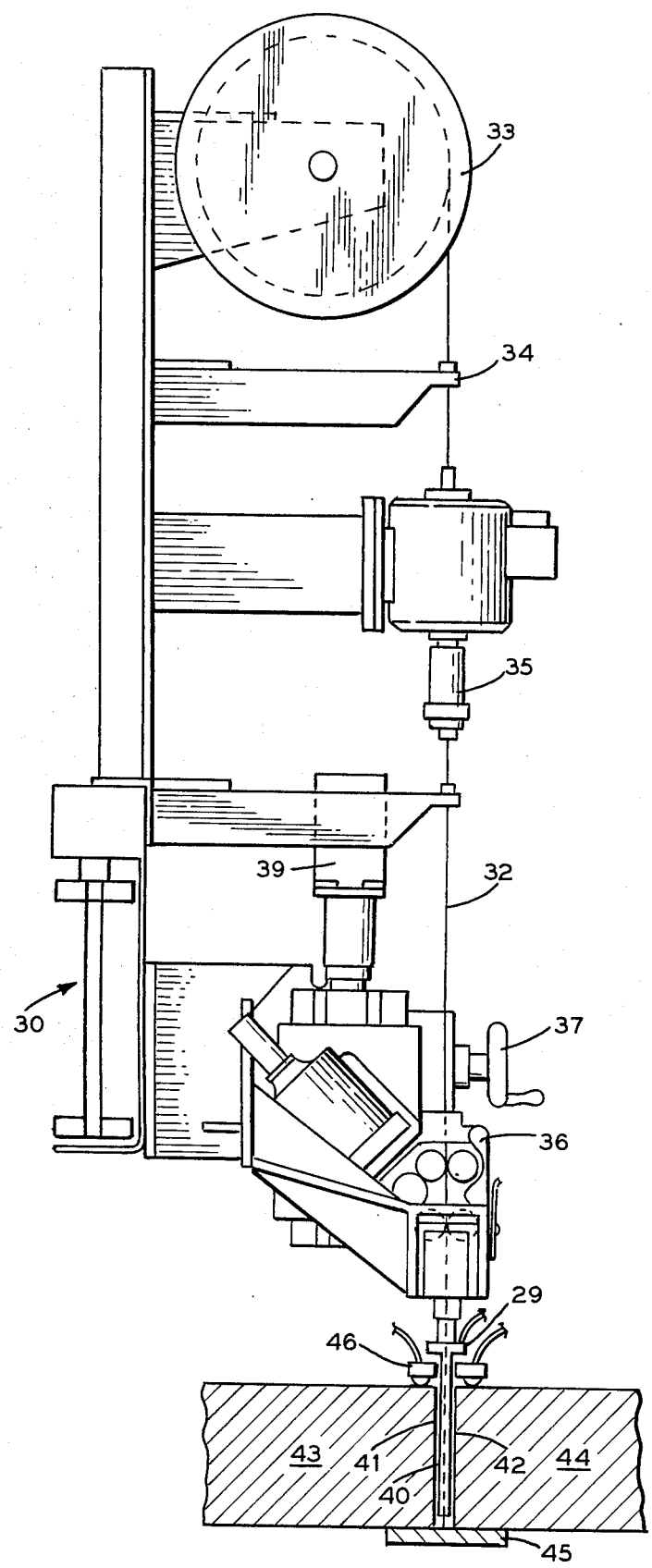
FIG. 5 is a schematic side view of the arrangement shown in FIG. 3.

In narrow gap or narrow groove welding the adjacent walls will be spaced apart ¼ to ½ inch and the depth of the groove to be filled with weld metal may be 2 to 10 inches, or more. To attain a high quality weld under these conditions, I have found the consumable welding wire must be accurately guided with the arc positioned in the center of the groove and protected by a proper gaseous atmosphere. This can be accomplished by use of a welding head projecting into the groove with the head providing an insulated path for passage of the welding wire.

As shown in FIGS. 1 and 2, a suitable welding head 10 is illustrated, where the width of the head assembly is approximately ¼ of an inch and the length about 5 inches. The depth shown is about 4 inches, and the head shown is usable in welding plates of about 4 inches and less in thickness. For greater thickness of plates, a corresponding greater depth of head would be used.

In the embodiment shown, the welding head 10 is made generally in two parts, with the weld wire guide portion 11 with a vertically extending wire passageway 11A detachably connected in wing or end portions 12 and 13, forming a rigid unitary welding head.

Alternately, the welding head 10 may be made of one piece. However, in the construction described, the guide portion 11 is subjected to most severe conditions, and can be replaced if necessary. The end portions 12 and 13 have oppositely inclined and facing bottom surfaces 14 and 15, respectively, which are each open to a tapered internal cavity 16 and 17, each supplied with gas to protect the arc during welding. Each cavity 16 and 17 is supplied with gas through tubes 18 and 20, respectively, and each is provided with a slug 21 of pourous metal to distritbute the gas for discharge through the openings 14 and 15, which are filled with steel wool.

The guide portion 11 of the head is further provided with water cooling passageways 24 to maintain a reasonable temperature therein. The welding head 10 is provided with openings 25 and 26 near the lower end of the wing or end portions 12 and 13 for the insertion of eddy current or magnetic sensors 27 and 28 which are used to detect the exact lateral position of the welding head 10 relative to the side walls of the groove.

The welding head 10, illustrated in FIGS. 1 and 2, has been constructed of different materials where the best material so far tried has included a metallic member coated by a ceramic material. It is apparent the welding head must be electrically insulated from the work piece being welded and the coating thereon must be resistant to distortion by reason of localized heating and must also be resistant to abrasive wear since the welding head 10 may touch protuberances on the surfaces forming the wall of the groove. The latter condition may occur when the heat involved in welding the joint may cause some distortion of the walls of the groove which results in a change in the cross-sectional dimension of the groove. The welding head has been constructed of aluminum with the surface thereof anodized to provide both an electrical insulator and a surface resistant to wear. Other materials meeting the requirement of electric resistant and ability to withstand wear may be selected.

In the actual installation and operation of the welding head 10, it is necessary to make the structure sufficiently stiff so that it will not distort and rub on the walls of the groove. In one version of the structure, a metallic bar 29 or bars have been placed on the upper end of the head 10 to act as a stiffener.

In the narrow groove welding apparatus and procedure of the present invention the welding head 10 is inserted in the narrow groove for proper deposit of weld material therein. Under these circumstances, it is necessary for the structure supporting the welding head to be rigidly fixed to the welding head while permitting closely controlled movements of the welding head relative to the work piece. Such movements of the support structure will be longitudinally of a groove, laterally of the groove and vertically within the groove. Ordinarily, in welding large work pieces, it is desirable for the work piece to move relative to the welding head. However, under some conditions, it is necessary for the welding head and its supporting structure to be moved relative to the groove, particularly along the longitudinal extent of the groove. As is well known in the art, it is difficult to accomplish longitudinal movement of a welding head relative to a fixed work piece due to complications of connecting conduits for electric and gas connections to the welding head and to pass the cooling water flow to and from the welding head 10.

In the embodiment shown in FIGS. 3, 4 and 5, the welding head 10, and its associated parts are mounted in a generally fixed position upon a support structure 30, and the work piece 31 will be moved at a controlled rate longitudinally of the groove 40 relative to the generally fixed position of the welding head 10. Under these conditions, it may be necessary for the head 10 to be moved laterally of the groove as by hand wheel 37 so as to maintain the arc centered relative to the groove. Necessary vertical movement of the torch head 10 relative to the work piece 31 will be attained by a motorized mechanism 39 arranged to move the lower portion of the mechanism relative to the support 30. Since in the present invention the electrode is of the consumable variety, the source of electrode or weld wire 32 may be mounted on the welding head supporting structure 30 and usually takes the form of a drum 33 on which the welding wire is mounted. Alternately, the drum of wire may be separately mounted. The wire 32 leaving the drum passes through a rate measuring device 34, a straightener 35 (such as an AIRCO wire straightener Stock Number 2354-0161.) and a controlled rate drive mechanism 36 (such as an AIRCO Machine Head, Model AMH-H Head, Stock Number 2353-0204) to be passed through the welding head 10 The arrangements for mounting a welding apparatus, relative to a work piece are known in the welding art and further details of an arrangement such as illustrated are not considered necessary for an understanding of the invention.

As shown, the welding head 10 is inserted in the groove 40 defined by the walls 41 and 42 of the plates 43 and 44. The plates 43 and 44 are maintained in positional relationship by a plate 45 spanning the width of the groove and may be further reinforced by a "strong back" bar or bars (not shown), as required.

The welding head 10 is provided with an upper shield 46 which loosely encloses the head 10 and rests on the top surface of the plates 43 and 44. The shield 46 is supplied with a flow of arc protective gas, as hereinafter described, to inject such gas into the upper levels of the groove 40 to supplement the flow of gas through the head 10 by way of passageways 16 and 17 as shown in FIG. 1. As successive weld beads are deposited in the bottom of the groove the welding head 10 is incrementally moved vertically in the groove with the shield 46 maintained in its vertical position relative to the upper surface of the plates 43 and 44. The shield 46 is provided with rollers on its lower surface which are in rolling relationship with the plates 43 and 44, and is preferably equipped with pourous metal gas diffusers which also direct the gas downwardly into the groove 40. The need for the shield becomes most important for arc protection purposes as the weld deposit in the groove 40 approaches the upper surface of the plates 43 and 44.

To obtain a sound high quality weld deposit, it is essential to coordinate the relative movement of the welding head and the work piece longitudinally in the groove, and at the same time to closely control the rate of wire supply to the arc and the electrical power input to the arc. This is accommplished by means of an electric control which is actuated by the exact, instantaneous measurement of the wire stick-out between the end of the welding head 10 and the weld bead being deposited in the groove. In effect this control measures the arc current, and any change therein is compensated by a change in distance between the welding head 10 and plate 45.

Figure 6:
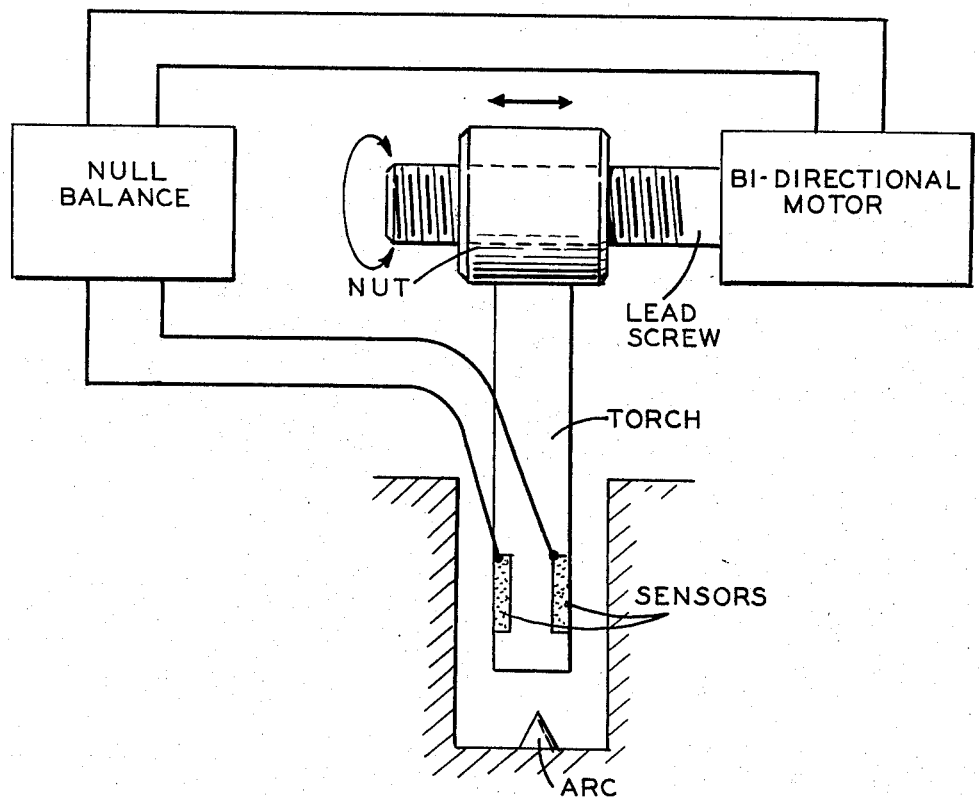
FIG. 6 is a diagramatic arrangement for controlling the lateral movement of the welding head.

To center the electrode laterally of the groove, it has been found possible to manually control the lateral movement of the welding head 10 relative to the walls of the groove and thus center the welding arc. This can be possible by use of optical means for determining the exact location of the arc relative to the width of the groove. Mechanical arrangements are also possible, but in commercial operations, it is desirable to automatically control the lateral location of the welding arc relative to the width of the groove, and as shown in FIG. 6, this can best be accomplished by means of the electromagnetic sensors 27 and 28 which operate through a null balance system to move the welding head 10 in a lateral direction by the use of an electrical motor as shown in FIG. 6 in place of the hand wheel 37.

When the particular head illustrated in the drawings has been utilized, the welding procedure involved specific values of current flow, specific travel rates and gas flow rates which will be selected to meet the actual needs of the weld deposit being formed. For example, when welding a 3 to 4 inch deep groove, the spacing between the opposed faces of the groove will be slightly over 3/10 of an inch. In welding a groove such as described, an amperage value of 235 was utilized with a voltage varying between 31.5 and 34. Under these conditions, the relative travel speed of the welding head 10 and the work piece 31 was in the range of from 13 to 20 inches per minute. Each pass between welding head 10 and work piece 31 formed a deposit about ⅛ of an inch thick. It is, of course, understood that when welding a groove of the type described, it is desirable to preheat the metal, and it has been found that a starting temperature of approximately 250°F – 400°F is a satisfactory temperature to attain a quality weld. On the same basis, the interpass temperature should also be approximately 250°F and above to permit the application of successive layers of weld bead in filling the groove.

Under the above conditions, it has also been found desirable to utilize arc protective gas formed of a composition consisting of approximately 70 to 75 percent helium, 19 to 24 percent argon and 6 percent $CO_2$. The gas is introduced adjacent the welding arc at a rate of about 40 standard cubic feet per hour. The same gas is introduced at the top of the groove at a rate of from 70 to 100 standard cubic feet per hour. Under these conditions, a high quality weld may be made. It is of course, understood that the wire is centrally positioned relative to the side walls of the groove since if one side of the arc gets too close to one of the side walls the arc may climb up the side wall so that only one side of the weld bead will be wetted. The arc width under the conditions described will just bridge the side walls of the joint and with the shielding gas specified, and in the quantities disclosed, the arc will have good penetration and good stability and will wet both side walls of the groove.

The embodiments of the invention in which an exclusive property or privelege is claimed are defined as follows:

1. In narrow groove welding the combination comprising a work piece having a narrow groove therein with substantially parallel walls and a groove width substantially less than the depth thereof, an electric welding machine positioned exteriorly of the work piece and having a welding head projecting into the groove, means for positioning the welding head in a direction parallel to the depth of the groove, means for controlled relative movement of the work piece and the electric welding machine parallel to the narrow groove, means for feeding a consumable electrode wire through the welding head into the groove, means for applying electric power through the consumable electrode wire to form an arc between the end of the wire and the work piece to weld join walls of the groove whereby the weld metal fuses both sides of the groove equally in a single pass, control means for regulating the rate of electrode wire feed to the arc, means for maintaining the tip of the electrode wire centered in the groove by transverse movement of the welding head relative to the walls of the groove, means for passing a protecting gas through the welding head to surround the welding arc in the groove, a shield loosely enclosing the welding head and resting on the surface of the work piece, and means for passing a stream of protective gas through the shield to flood the upper portion of the gap in the work piece.

2. The combination of claim 1 wherein the narrow groove is approximately 0.3 inch in width.

3. The combination of claim 1 wherein the work piece moves longitudinally of the groove relative to the position of the welding head.

4. The combination of claim 1 wherein transverse movement of the welding head is responsive to an indication of the deviation of the head from the opposite walls of the groove to maintain the wire tip centered in the groove.

5. The combination of claim 4 wherein eddy current sensors positioned in the frame detect deviation from the midpoint of the groove.

6. The combination of claim 5 wherein means actuated by the sensors shift the transverse position of the head.

7. The combination of claim 1 wherein the protective gas consists essentially of a mixture of helium, argon and carbon dixoide.

8. The combination of claim 7 wherein the helium content is between 70 and 75 percent, the argon content is between 19 and 24 percent and the $CO_2$ content is approximately 6 percent.

9. The combination of claim 8 wherein the preferred gas mix is 70 He, 24A and 6 percent $CO_2$.

* * * * *